Jan. 26, 1937.  J. F. ENGLE  2,069,105
AIR VALVE
Filed March 14, 1932
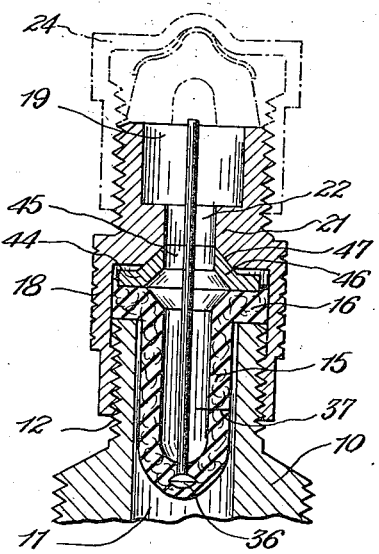
FIG.2
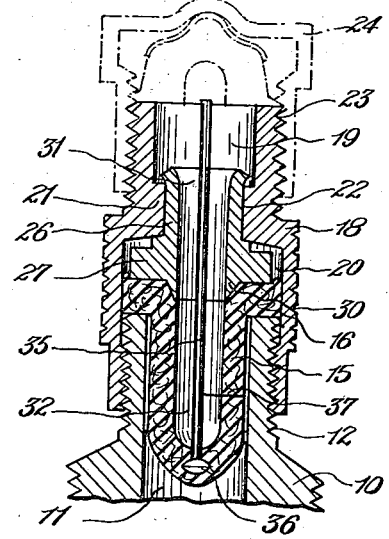
FIG.1
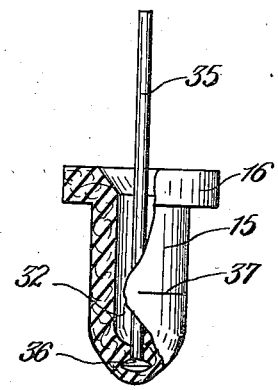
FIG.3
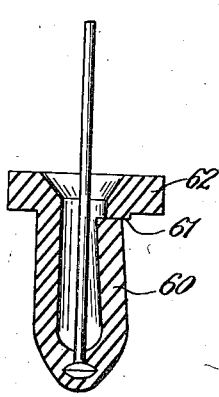
FIG.7
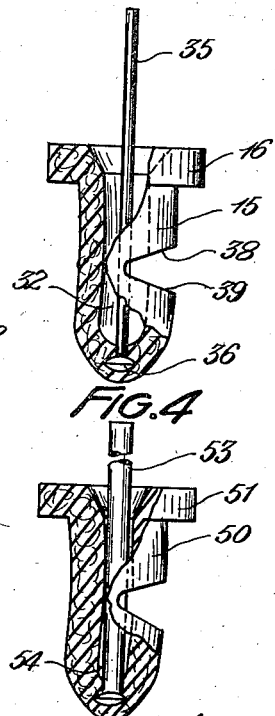
FIG.4
FIG.6
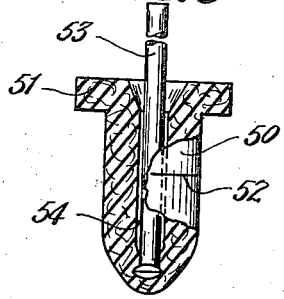
FIG.5
INVENTOR:
JOHN F. ENGLE
ATTORNEYS Patented Jan. 26, 1937

2,069,105

UNITED STATES PATENT OFFICE 2,069,105

AIR VALVE

John F. Engle, Lakewood, Ohio

Application March 14, 1932, Serial No. 598,605

3 Claims. (Cl. 152—12)

The present invention relates to a valve and more particularly to an air valve for use in connection with inflatable articles, such as balloons, air cushions and especially automobile tires, although it may be used for other purposes as will hereinafter appear.

This application is a continuation in part of my co-pending application, Serial No. 555,618, filed August 6, 1931, and the invention consists broadly in providing a valve made of an elastic member having an aperture which is normally sealed by the inherent elasticity of said member, but which can be opened to permit the passage of air to the article to be inflated, and which will automatically close or seal, by its inherent elasticity, as soon as the operating pressure or the means which retains the valve open is released and the opening sealed or closed by the pressure of the air contained within the inflated article, in addition to its elasticity.

An object of the invention is the provision of an extremely cheap and simple form of valve, which can be readily adapted for use in various articles, which will be rugged in construction and positive in operation.

Another object of the invention is the provision of a valve of the type referred to, which can be applied to the standard type of automobile tire valve stem.

Another object of the invention is the provision of a valve of the type referred to, which can be readily opened for the purpose of permitting ingress and egress of air, which will close by its inherent elasticity upon being released, and which can be inflated, etc., in the customary manner and with the standard equipment in common use.

Another object of the invention is the provision of a valve of the type referred to, which can be readily gauged by standard equipment in general use.

Another object of the invention is the provision of a valve which, in addition to being closed by its own elasticity, will be maintained in its closed position by the pressure of the air contained within the inflated article.

Another object of the invention is the provision of a novel valve, which can be removed as a whole without the use of tools, from the valve stem for the purpose of quickly permitting the deflating of the article or for replacement.

Other objects and advantages of the invention will be apparent to those skilled in the art from the following description of the preferred embodiment thereof, described with reference to the accompanying drawing in which:

Fig. 1 is a sectional view of an automobile tire valve stem provided with the valve of the present invention;

Fig. 2 is a view similar to Fig. 1, but showing a modified construction thereof;

Fig. 3 is an enlarged view of the valve shown in Figs. 1 and 2;

Fig. 4 is a view similar to Fig. 3, but showing the valve in a different operating position;

Fig. 5 is a view similar to Fig. 3, but showing a slightly modified construction of valve;

Fig. 6 is a view similar to Fig. 5 showing the valve in a different operating position, and Fig. 7 is a view similar to Fig. 5 showing a modified construction of valve illustrating its operation.

Referring to the drawing, wherein the invention is illustrated as applied to a standard tire valve stem, the reference character 10 designates the cylindrical valve stem having a longitudinal passage 11 therethrough and a reduced externally threaded portion 12 at the upper end thereof.

A valve 15 for controlling the ingress and egress of air to and from the tire or other body to be inflated is preferably made of suitable elastic material, such as rubber, properly vulcanized so as to have sufficient firmness or rigidity to maintain its proper form or shape, but at the same time sufficiently soft, yielding and elastic to properly function at all times.

The valve is in the form of a thimble or capsule having an annular lateral flange or shoulder 16 at its upper end, and in practice is positioned with the flange resting upon the upper or outer end of the valve stem 10, with a washer or gasket positioned therebetween, if desired, and the closed end of the thimble or capsule portion projects downwardly into the passage 11. A cylindrical body or shell member 18 provided with a central recess 19 in the upper end thereof, and which is bored out from the lower end upwardly a considerable distance, as indicated at 20, leaving an intermediate portion 21 provided with an aperture 22, is threaded upon the upper end 12 of the valve stem 10. The upper end of the member 18 may be externally threaded, as illustrated at 23, to receive an ordinary dust cap 24.

Preferably a metallic sleeve 26 having an annular flange 27 at its lower end is fitted into the member 18 with the sleeve 26 positioned in the central bore 22, and the flange 27 positioned within the upper end of the bore 20. A small lip or bead 30 formed upon the lower face of the flange 27 surrounding the central opening 31 of said sleeve is adapted to fit into the upper end of the central cavity 32 of the valve. The metallic sleeve 26 acts as a swivel as hereinafter explained.

An actuating pin 35 is molded or otherwise secured in the closed bottom of the valve 15, and, as illustrated, the lower end of the pin 35 has a rounded head or enlargement 36 in order to prevent the possibility of puncturing, etc. The pin 35 is preferably vulcanized in the bottom of the thimble or capsule, as clearly shown, and is of such a length that when the parts are properly assembled, the upper end will project upwardly and centrally through the upper recess 19, approximately flush with the top of the member 18, so that when the cap 24 is removed it is accessible for the purpose of actuating the valve either to inflate or deflate the tire, or gauge the pressure therein.

At one point in the side wall of the valve 15 there is provided a horizontal slit or aperture 37, preferably made after the vulcanization operation has been completed, by the insertion of a very thin sharp blade. This produces a slit with complementary upper and lower surfaces 38 and 39, respectively, and due to the inherent elasticity of the material from which the valve is made the slit or aperture will normally remain closed. The slit 37 is preferably made adjacent the middle of the side wall, as illustrated for a purpose hereinafter explained.

It will be understood that in the arrangement of the various parts the pin 35 extends through the sleeve 26 and the upper end of the valve contacts with the circular flange 27 of said sleeve. The sleeve 26 occupies the central passage 22 through the member 18, and its upper end projects into the central recess 19, where it is riveted over to retain the parts in their assembled position. When the cylindrical member 18 is screwed upon the upper or outer end of the valve stem, the sleeve 26 acts as a swivel and turns to a certain extent during the seating operation of the flange 16, and thereby prevents tearing or wearing of the rubber, etc. The valve 15 is securely held in place between the upper end of the valve stem and the flange 28 of the sleeve 26 which serves as a guide for the stem 35, and at the same time permits the passage of air therethrough.

In order to permit the ingress or egress of air it is necessary to deform the valve to such an extent that the slit 37 is opened. This deformation of the valve and the consequent opening of the slit is readily accomplished by pressing down upon the pin 35, which slightly elongates the same, see Fig. 4. The moment the operating pressure upon the pin is removed the inherent elasticity of the valve will move the pin upwardly and at the same time automatically close the slit or aperture. The closing takes place by the inherent elasticity of the material from which the valve is formed and in itself is sufficient to prevent the egress of air, but the pressure within the stem and the inflated article materially assists in sealing the opening and is an additional element of safety.

The valve may also be opened by the pressure of the air introduced, under some circumstances, but this alone is not satisfactory when conventional equipment for inflating tires to definite pressures is used. Such devices register the pressure in the air line, and when the pressure alone is relied upon, the pressure in the tire is less than the pressure in the line, an amount equal to the pressure required to open the valve. Since the amount of pressure required to open the valve will vary for different valves and for the same valve throughout its life, the difference between the pressure in the line and that in the tire cannot be compensated for. The actuating pin also permits the valve to be gauged by standard pressure gauges, etc., and being fixed in the valve is always available and cannot be lost, etc.

Instead of the metallic sleeve 27 a different form of swivel to prevent tearing of the valve may be employed. Fig. 2 illustrates a modified construction wherein a thin metallic disk 44 having an aperture 45 and an inclined flange 46 adapted to contact with the lower edge 47 of the bore 22 and turn upon said edge to provide the necessary swiveling action and prevent the tearing of the rubber, is positioned between the valve 15 and the intermediate part 21 of the member 18.

Figs. 5 and 6 illustrate a slightly modified construction of valve. The valve 50 illustrated in these figures, is substantially the same in shape as the valve illustrated in Figs. 1 to 4 inclusive, and is provided with an annular flange 51, a slit or aperture 52, an actuating pin 53, and a cavity 54. The valve 50 can be substituted for the valve 15 in either of the assemblies illustrated in Figs. 1 and 2. In the embodiment of the invention illustrated in Figs. 5 and 6, the diameter of the pin 53 is slightly less than the cavity 54 in the interior of the valve through which it projects.

When the valves are subject to high pressures, as in the case when employed in high pressure tires, etc., the seal is further effected by the closing in of the valve body about the actuating pin. The amount of this action may be varied by changing the length of the valve and/or the thickness of the walls thereof.

Particular attention is directed to Figs. 4 and 6, which show the valves in their open positions. It will be noted that the transverse positions of the slits 37 and 52, relative to the axis of the actuating pins 35 and 53, cause the slits or apertures to open similar to a scissors action. The aperture will open first and close last at the center of the slit. The movement of the actuating pin is approximately longitudinal of the axis thereof, due to the guiding action of the member 18, etc., and upon being depressed produces an approximately longitudinal elongation of the valve, combined with a slight hinging of the lower part about an axis approximately in the plane of the slit.

As the aperture opens the point of contact between the upper and lower edges 38 and 39 of the slit will move towards the left, as viewed in the drawing. In closing, the action will be the reverse, the aperture closing from the ends towards the right, as viewed in Figs. 4 and 6, with a wiping or creeping action and the point of contact between the upper and lower edges, moving in the same direction. The action of the valve described above produces a very effective seal. The walls of the valve are relatively thick in comparison with the size of aperture, and the scissors action causes the upper and lower edges 38 and 39 to find their proper positions relative to each other, which is of great practical importance due to the impossibility of making these surfaces perfectly smooth, but since these surfaces are complementary the seal is just as effective if they can be properly matched in closing.

The actuating pin inside of the valve assists in properly matching the upper and lower edges of the slit upon closing and this is particularly true when the diameter of the pin approaches that of the cavity. An object of positioning the slit adjacent the center of the side wall is to prevent the internal pressure of the inflated article from disaligning the edges thereof either during or after closing of the aperture. When the rigidity of the parts below and above the slit is not the same the internal pressure will cause one to flex more than the other and prevent the proper aligning of the edges 38 and 39. An exaggerated illustration of this condition is shown in Fig. 7 where the valve 60 is provided with a slit 61 adjacent the flange 62. As will be apparent to those skilled in the art the position of the slot may be varied slightly from the center of the side wall depending upon the construction of other features of the valve, such as the thickness of the wall, the elasticity of the material from which the valve is made, and the size of the actuating pin and/or the enlarged part thereof molded in the valve.

It will thus be understood that whenever it is desired to inflate the tire or other article it is only necessary to press down upon the actuating pin 35 and simultaneously introduce air which passes out through the slit or aperture 37. As before stated, as soon as the operating pressure is removed from the pin 35, the thimble or capsule contracts and automatically closes the aperture, thereby retaining the air within the inflated article. In order to deflate the article it is only necessary to apply operating pressure to the pin 35 and hold the same in that position until the tire or other article has been deflated to the proper extent. The same is true when gauging the pressure within the tire. The cylindrical member 18 with the rubber valve, actuating pin and swivel contained therein can be assembled as a unit and screwed upon the outer end of any of the tubular valve stems now in use and the device is ready for operation. The cap 24 is the same cap now employed upon all standard valve stems.

Having the entire valve mechanism carried by the cylindrical member 18, which is readily detachable from the valve stem, is also advantageous when quick deflation of the tire or other article is desired. This quick deflation is desirable in the fabrication of the tire, as each tube must be tested and then deflated for shipment, and this deflation under the present type of valves takes considerable time. After deflation the valve must be once more set in place, requiring considerably more time than merely screwing the cylindrical member 18 upon the valve stem. This quick deflation is also advantageous in changing a tire where the tube must be deflated before the change can be made.

While the invention has been described with reference to the preferred embodiment and a modification, it is to be understood that it is capable of various modifications within its scope and that this application is intended to cover any and all variations, uses or adaptations thereof following in general the principles of the invention and including such departure from the present disclosure as come within knowledge or customary practice in the art to which it pertains, and as may be applied to the essential features set forth, and I particularly point out and claim as my invention:

1. A valve comprising a resilient tubular member closed at one end and including a substantially cylindrical section, a transverse slit in the side of said cylindrical section extending less than 360° about the circumference thereof, and an actuating member provided with a head embedded in the closed end of said tubular member extending through said cylindrical section projecting beyond the other end of said tubular member and adapted to open said slit upon longitudinal movement thereof, said actuating member being smaller than the opening in said tubular member so as to provide an air passage between said members.

2. A valve comprising a resilient tubular member closed at one end and including a substantially cylindrical section, a transverse slit in the side of said cylindrical section normal to the axis thereof and extending less than 360° about the circumference of said tubular member, and an actuating member smaller than the opening in said tubular member provided with a head embedded in the closed end of said tubular member, said actuating member extending through said cylindrical section and projecting beyond the other end of said tubular member and adapted to open said slit upon longitudinal movement thereof, the diameter of said actuating member being not less than 60% of the inside diameter of said tubular member and adapted to prevent collapse of said tubular member under high pressure.

3. A valve assembly comprising a member provided with an aperture, a resilient tubular rubber valve member closed at one end and including a substantially cylindrical section positioned over said aperture and supported adjacent the open end thereof with the closed end extending into said member, a transverse slit in the side of said cylindrical section normal to the axis thereof and extending less than 360° about the circumference of said tubular valve member, said slit being so positioned that the side walls of said tubular member above and below the same will be of approximately equal rigidity, and an actuating member smaller than the opening in said tubular valve member connected to the closed end of said tubular valve member extending through said cylindrical section and projecting beyond the other end of said tubular member, said actuating member being adapted to open said slit upon longitudinal movement thereof and prevent collapse of the side walls of said tubular member under pressure.

JOHN F. ENGLE.